United States Patent [19]

Epps

[11] Patent Number: 5,054,021

[45] Date of Patent: * Oct. 1, 1991

[54] CIRCUIT FOR NULLING THE TALKER'S SPEECH IN A CONFERENCE CALL AND METHOD THEREOF

[75] Inventor: David C. Epps, Denver, Colo.

[73] Assignee: ConferTech International, Inc., Golden, Colo.

[ * ] Notice: The portion of the term of this patent subsequent to Jul. 23, 2008 has been disclaimed.

[21] Appl. No.: 490,092

[22] Filed: Mar. 6, 1990

[51] Int. Cl.$^5$ .................. H04M 3/42; H04Q 11/04
[52] U.S. Cl. .................................. 370/62; 370/77; 379/202
[58] Field of Search ................ 370/62, 68, 61, 68.1, 370/66, 77, 79, 110.1, 58.1, 58.2, 58.3; 379/202, 206, 207

[56] References Cited

U.S. PATENT DOCUMENTS

| | | | |
|---|---|---|---|
| 4,109,111 | 8/1978 | Cook | 370/62 |
| 4,416,007 | 11/1983 | Huizinga et al. | 370/62 |
| 4,485,469 | 11/1984 | Witmore | 370/68 |
| 4,797,876 | 1/1989 | Ratcliff | 370/62 |

FOREIGN PATENT DOCUMENTS 2146506  4/1985  United Kingdom .................. 370/62

Primary Examiner—Douglas W. Olms
Assistant Examiner—Alpus H. Hsu
Attorney, Agent, or Firm—Dorr, Carson, Sloan & Peterson

[57] ABSTRACT

A method and circuit for nulling each talker's speech in a conference call having a plurality of parties who are selectively talkers and listeners. The parties are interconnected on PCM telephone carrier lines (T1 or CEPT) which are connected to a digitized conference bridge. The circuit of the present invention has a summation circuit for adding together all of the speech data on the carrier lines occurring in the conference call during a particular time slot. A circuit is used for delaying the speech of each individual talker. Finally, the circuit of the present invention utilizes a subtraction circuit for subtracting the delayed speech of each individual talker from the summation of all speech for delivery back to the ears of the individual talker. The delaying circuit precisely delays the speech of each individual talker so as to corespond in timing with the output of the summation circuit. The present invention fully deletes the individual talker speech so as to totally eliminate echo and the timing is such so as to eliminate distortion.

16 Claims, 6 Drawing Sheets

Fig. 7

| TALKER | TSG | SUBTRACT | LISTENER |
|--------|-----|----------|----------|
| A | 1 | B + C + D | A |
| B | 1 | A + C + D | B |
| C | 1 | A + B + D | C |
| D | 1 | A + B + C | D |

TSO

Fig. 8

| TALKER | TSG | SUBTRACT | LISTENER |
|--------|-----|----------|----------|
| A | 1 | B + D | A |
| B | 1 | A + D | B |
| — | 0 | A + B + D | C |
| D | 1 | A + B | D |

TSO

Fig. 9

$A+B+C+D$ — TSO — 20 → μ-LAW or A-LAW PCM SUBTRACTER (60) → 30

$\Delta T$ — TSO A — 54 →

$TSG_A$ ↑

| PARTY | ACTIVITY | SUMMATION OUTPUT 20 | TALKING NULLING | WHISPER | CONVERSATION HEARD 30 |
|-------|----------|---------------------|-----------------|---------|------------------------|
| A | TALKING | A + F | -A | | F |
| B | WHISPER | A + F | | +E | A + F + E |
| C | QUIET | A + F | | | A + F |
| D | QUIET | A + F | | | A + F |
| E | WHISPER | A + F | | +B | A + F + B |
| F | TALKING | A + F | -F | | A |

CIRCUIT FOR NULLING THE TALKER'S SPEECH IN A CONFERENCE CALL AND METHOD THEREOF

BACKGROUND OF THE ART

1. Related Invention

This invention is related to Serial No. 07/490,095, Filed Mar. 6, 1990, and entitled "Whisper Circuit For A Conference Call Bridge Including Talker Nulling And Method Therefore" by the same inventor.

2. Field of the Invention

The present invention relates to digital domain conference calls via a telephone network and, in particular, to a circuit for removing one hundred percent of the talker's speech component from the conferencing bridge speech data output prior to transmission back to the talker when the signal is represented in the pulse code modulation (PCM) digital domain.

Statement of the Problem

A problem exists in present conference calls on the telephone network wherein an echo is heard by a talker when a large number of talkers are summed together. A number of approaches are available for minimizing the echo that a talker hears when talking such as half duplexing circuitry, voice activated switching, and the like. Despite the existence of several solutions to the problem, a need exists for a circuit for use in the digital domain that eliminates one hundred percent of the talker's speech component during transmission back to the ears of a talker in a conference call.

Solution to the Problem

The present invention provides a solution to the above problem by providing a circuit designed to remove the digitized speech of any one of a plurality of talkers being summed together at the conferencing bridge. The talker's speech component is one hundred percent removed before delivery back to the ears of the talker. This process occurs without speech distortion.

SUMMARY OF THE INVENTION

The present invention sets forth a circuit for individually nulling each talker's speech in a conference call having a plurality of parties who are selectively talkers and listeners on a PCM telephone system. The parties are interconnected on PCM telephone carrier lines which are connected to a digitized conference bridge The circuit of the present invention has a summation circuit for adding together all of the speech data on the PCM telephone carrier lines occurring in the conference call during a particular time slot. The circuit of the present invention also utilizes a circuit for delaying the speech of each individual talker. Finally, the circuit of the present invention utilizes a subtraction circuit for subtracting the delayed speech of each individual talker from the summation of all speech for delivery back to the ears of the individual talker. The delaying circuit precisely delays the speech of each individual talker so as to correspond in timing with the output of the summation circuit. The present invention fully deletes the individual talker speech so as to totally eliminate echo and the timing is such so as to eliminate distortion.

DESCRIPTION OF THE DRAWING

FIG. 7 sets forth a first example of four parties on a conference call with each party talking;

FIG. 8 sets forth a second example of four parties on a conference call with three parties talking; and FIG. 9 sets forth the block diagram details of the subtraction circuit of the present invention.

DETAILED SPECIFICATION

Figure 1:
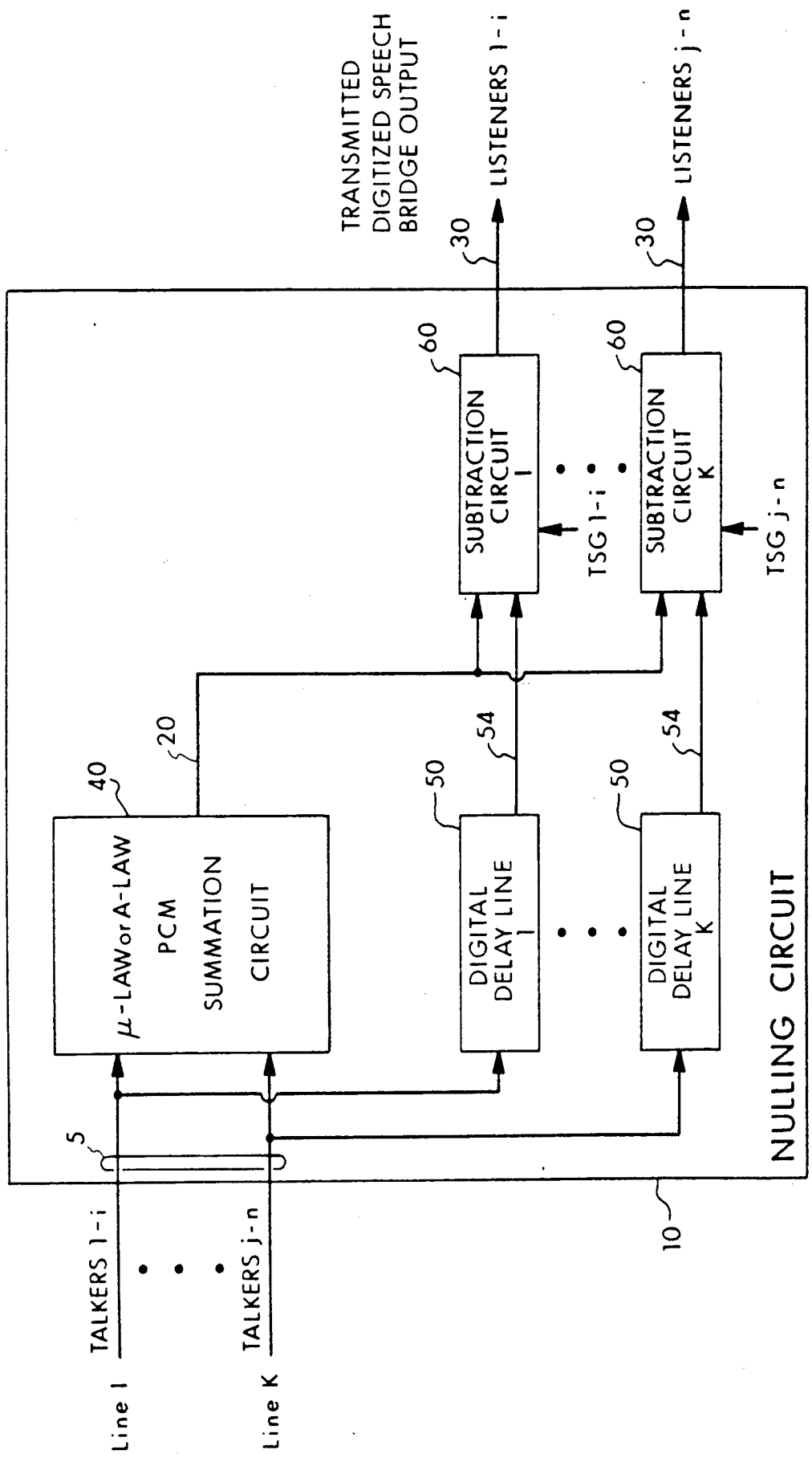
FIG. 1 is an overall block diagram of the present invention showing the summation circuit, the delay lines, and the subtraction circuits.
Figure 2:
FIG. 2 is a prior art representation of PCM companded data in CEPT format.
Figure 3:
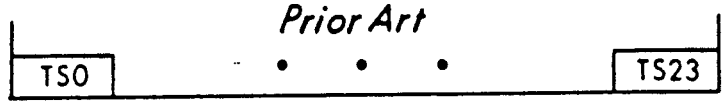
FIG. 3 is a prior art representation of PCM companded data in T1 format.

FIG. 1 sets forth the block diagram representation of the nulling circuit of the present invention 10. The nulling circuit 10 is connected to conventional lines 5 wherein each line contains a number of talkers (such as 1-j on line 1) for a total of n talkers on the conference call involving n parties. For example, in FIG. 2, the CEPT (Conference Europeanen des Administrations des Postes et des Telecommunications) standard for digitized speech transmission on the telephone network is set forth. The CEPT Standard utilizes 32 time slots at a frequency of 2.048 Mb per second. Two of the CEPT time slots are not used for speech data. Each CEPT speech data time slot contains eight bits of speech data. Likewise, in FIG. 3, the T1 carrier standard in the United States is set forth to show 24 time slots at a frequency of 1.544 Mb per second wherein each time slot comprises eight bits of speech data.

With reference back to FIG. 1, in the preferred invention, k=4 since four PCM telephone carrier lines 5 are utilized. Under the CEPT standard (also termed "PCM 30"), the total number of parties would be 120 and under the T1 standard, the total number of parties would be 96. It is to be expressly understood that the present invention is not limited with respect to the value of k (i.e., the number of lines) or to the number of parties (i.e., the value of n).

The output of the nulling circuit 10 of the present invention is the transmitted digitized speech bridge output 30 which comprises the bridge output for the conference call, and which is delivered to the individual parties who listen to the speech output.

Within the nulling circuit 10 exists a μ-Law (or A-Law PCM) summation circuit 40, digital delay lines 50, and μ-Law (or A-Law) PCM subtraction circuits 60.

The μ-Law (or A-Law) summation circuit 40 simply sums the conversations of all the parties who are talking (i.e., the talkers) on lines 1-k for delivery as the bridge output to all of the conference call parties except to the listener who is also the talker. For example, if a talker is listening to the conversation, he hears all speech on line 20 except his own since his version of the conversation appearing on line 20 is delivered through a subtraction circuit 60 and over line 30 to him.

Hence, digital delay lines 50 are interconnected to lines 1-k. The output of each delay line 54 is delivered to a μ-Law (or A-Law) PCM subtraction circuit 60. Each subtraction circuit 60 receives the digitized speech data appearing on line 20 as well as the individual talker's delayed speech data appearing on line 54 and outputs the transmitted digitized speech data less the talker's speech data on lines 30. Each subtraction circuit 60 is further controlled by a talk slot grant (TSG) signal which corresponds to each individual talker 1-n.

The talk slot grant signals ($TSG_n$) are conventionally generated in conference calls. In FIG. 1, the parties on line 5 are talkers as determined by the algorithms used in the bridge to generate the TSGs. For example, such algorithms may conventionally include VOX, gain compensation, and/or a computer algorithm. For example, in a conference call of 20 parties, three parties could be talking. Each of these three talkers would have speech data appearing on lines 5 and each would have their respective TSGs activated. However, all 20 parties are listeners on lines 30 and would hear the conversation. The three talkers would have their individual speech subtracted since their corresponding TSGs are activated. The remaining parties would simply have the sum of all speech on line 20 delivered through the subtraction circuits 60 unaffected.

It can be readily appreciated upon reviewing FIG. 1 that for any talker 1-n, that his individual speech data will be delayed by a digital delay line 50 sufficiently long enough so that as the summation circuit 40 delivers the summation of all speech data in the conference call on output 20. The subtraction circuit 60 functions to fully subtract (100% subtract) out the individual talker's speech data when the speech is delivered back into the ears of the talker as a listener. Only the talker's individual speech data is subtracted out since all other talkers must hear the other conversations successfully. By subtracting out the individual talker's speech as it is returned to the talker's ear as a listener, echo is fully eliminated as well as fully eliminating distortion thereby creating a high quality sound for the conference call conversation to the individual talker.

It is to be expressly understood that a delay line 50 and a subtraction circuit 60 is provided for each line 5 and that in the present invention K delay lines 50 and subtraction circuits 60 are provided for n talkers.

1. Summation Circuit 40

Figure 4:
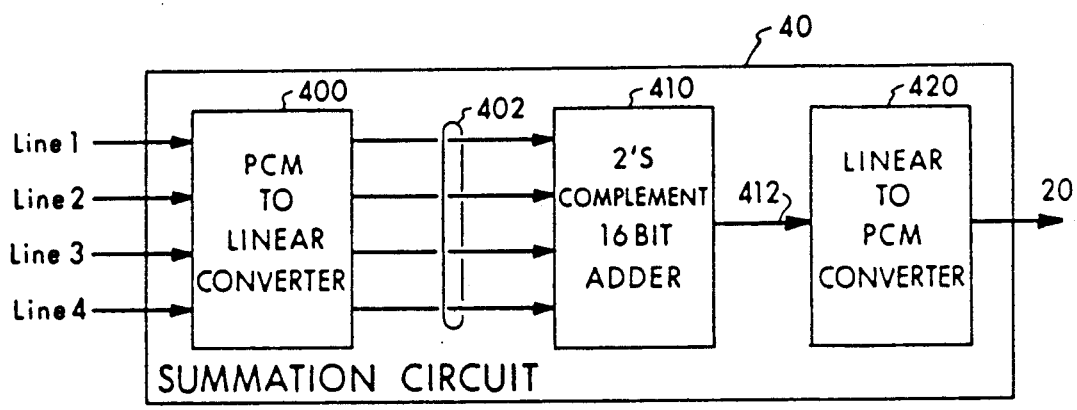
FIG. 4 sets forth in block diagram the format for the contents of the summation circuit of the present invention.

In FIG. 4, the details of the summation circuit 40 are shown. The summation circuit 40 includes a PCM to linear converter 400, a 16 bit (2's compliment) adder 410 and a linear to PCM converter 420. The PCM to linear converter 400 comprises a conventional 65536 byte EPROM look-up table. As mentioned, in the preferred embodiment, four telephone carrier lines are input to the summation circuit 40. The preferred embodiment, however, is not limited to four lines. The digitized speech data on lines 1-4 is in either μ-Law or A-Law PCM format as is the sum of all speech data on line 20.

The PCM to linear converter 400 delivers its output over lines 402 to the 16 bit 2's compliment adder 410 whose single output 412 is delivered to the linear to PCM converter 420 for outputting the sum of all speech data on line 20.

In the preferred embodiment, the PCM to linear converter is a 65536 byte EPROM based look-up table. The 16 bit adder 410 is a conventional multistage adder implemented in two 4-bit adders with carry/borrow stored for adding the high order 8 bits in the successive stage. For example, the adder can be of the type as the conventionally available 74 HCT-283. The linear to PCM converter 420 is also a standard 65536 byte EPROM based look-up table.

Figure 5:
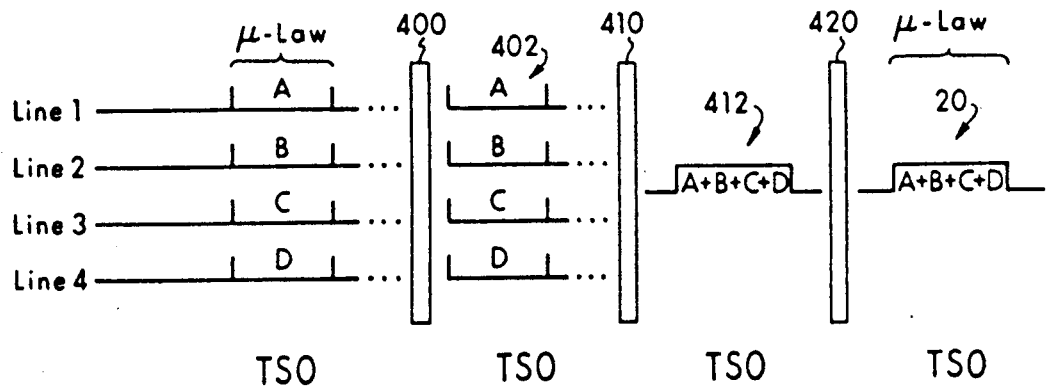
FIG. 5 sets forth the timing of the PCM and linear speech data as it flows through the summation circuit.

The summation circuit 40 operates according to the illustration in FIG. 5. In FIG. 5, the four lines 1-4 are shown having talk slot TS0 dedicated to four separate talkers/listeners; for example, parties A, B, C, and D. As mentioned, each time slot is eight bits wide and the data corresponding to the speech (if the person is talking) is coded according to conventional μ-law or A-law companded PCM encoded data. The PCM to linear converter converts the PCM encoded data into a linear code which in the preferred embodiment is 2's compliment form and sixteen bits wide. The 2s compliment form is used to express the positive and negative excursions of the represented analog wave form of the speech. The linear code for the speech data digitally corresponds to the actual analog value of the speech of individuals A, B, C, or D. If a party is not talking the value would be zero. The PCM to linear converter 400 is simply a standard look-up table wherein the eight bit companded PCM data is used as an address to look up the corresponding 16 bit 2's compliment form linear code. The data in linear code is a true digital representation of the speech from the individual speaker.

The sixteen bit adder 410 is a fixed state machine which adds the four linear encoded speech data values for individuals A, B, C, and D in time slot TS0. The resulting linear output from adder 410 is delivered on line 412 and is a sixteen bit data word in twos compliment form. The linear to PCM converter 420 converts the format of the 16 bit linear sum of all speech data back into PCM format—again through a table look-up. The μ-law encoding format is used for the T1 carriers whereas the A-law encoding format is used for CEPT carriers.

At this point in the operation of the present invention, it is clear that the summation circuit 40 is capable of adding together all talker speech data existing in each time slot by first converting the PCM speech data to linear speech data on lines 402, then adding the individual talker signals in each time slot together in the sixteen bit adder 410 which outputs a single summation signal on line 412 for each time slot for conversion from linear format back to PCM format on line 20. The output on line 20 is the summation of all sound (from talkers background noise, transmission noise, etc.) and exists as eight bit PCM speech data.

It is to be understood that the data field widths are by way of example and that the present invention is not to be limited to such data fields.

2. Operation of Delay and Subtraction Circuits 50 and 60

Figure 6:
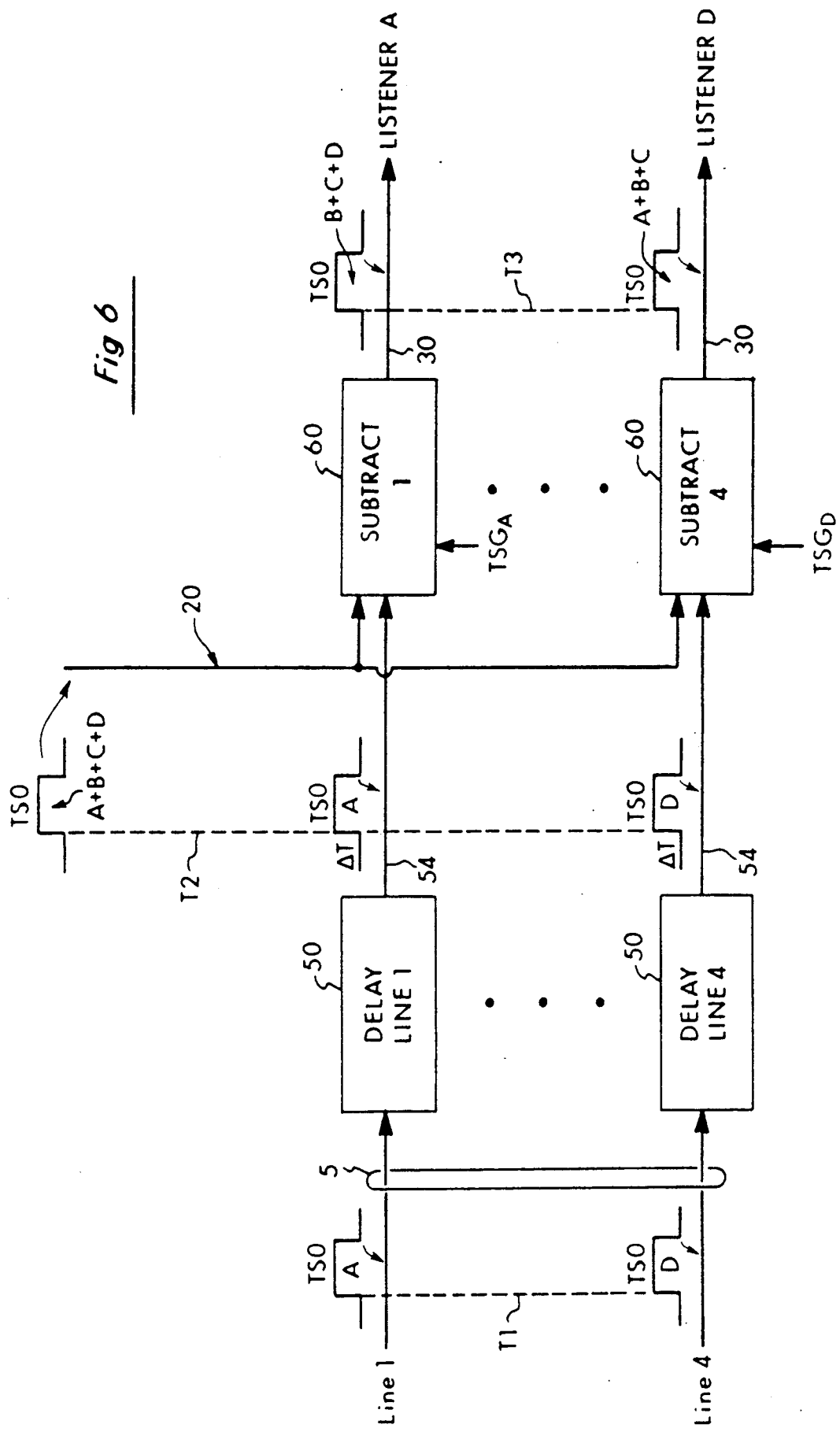
FIG. 6 sets forth the timing between the delay line and subtraction circuit of the present invention.
Figure 10:
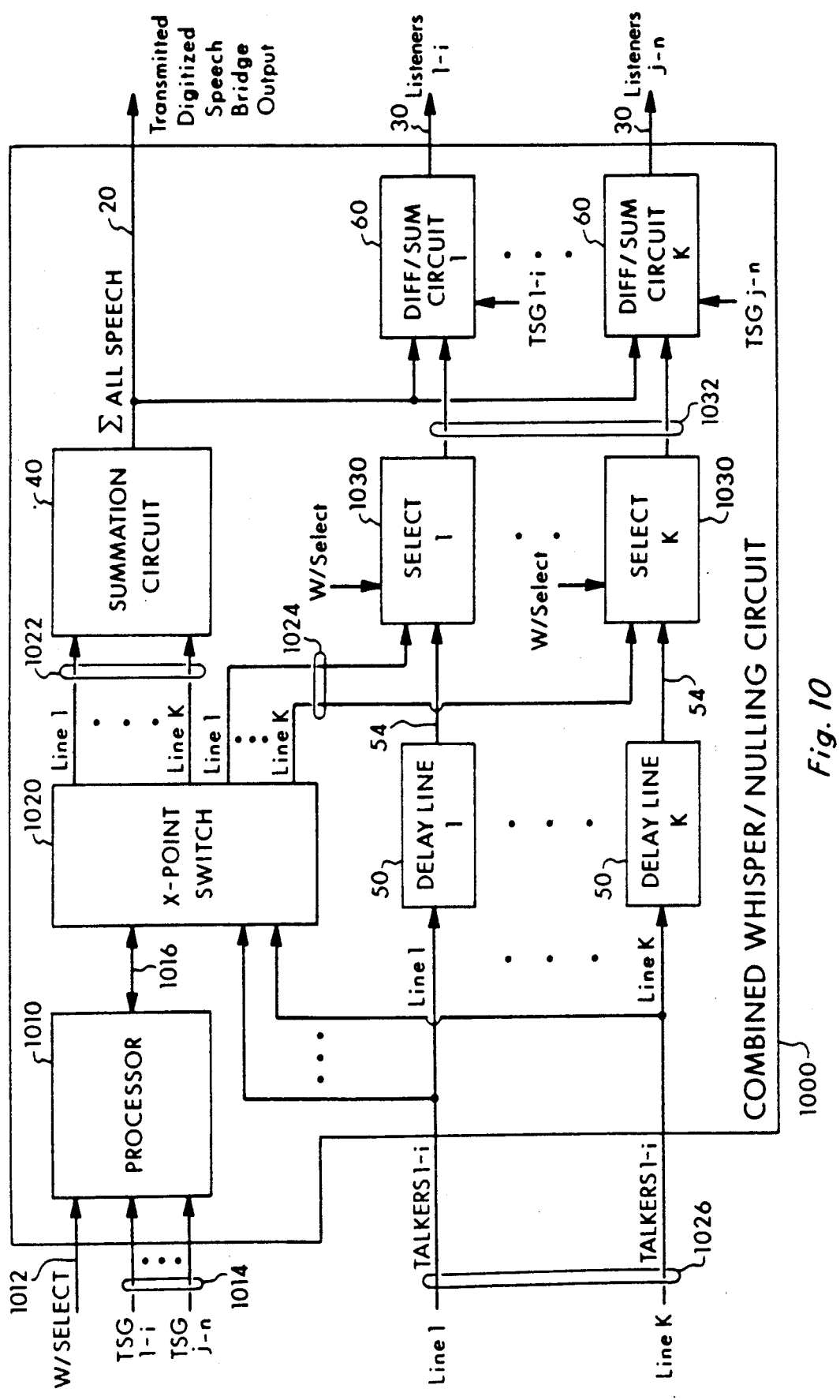
Figures 11, 12:
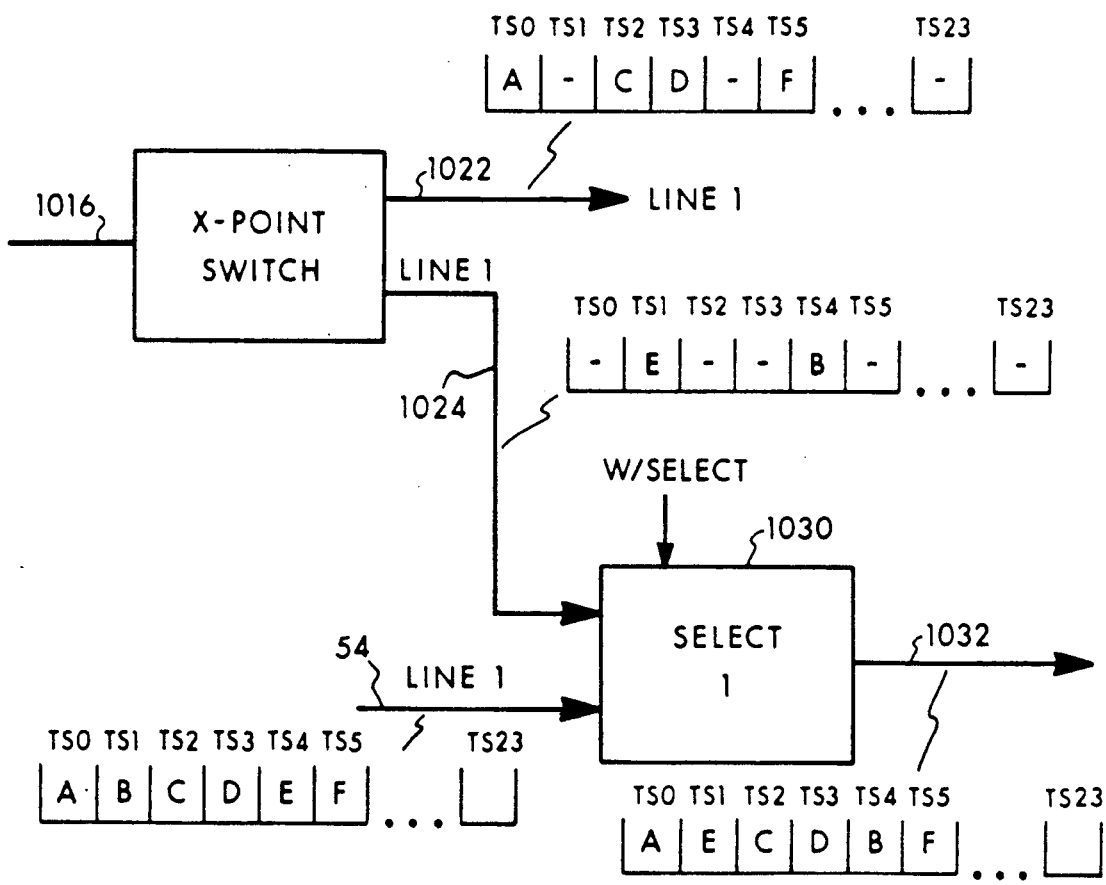

In FIG. 6, the details of the delay line circuits 50 and the subtraction circuits 60 are shown. As discussed with respect to FIGS. 4 and 5, the output 20 from the summation circuit 40 is the summation of all speech data for lines 5 in a common time slot which, in FIGS. 4 and 5, is shown to be talk slot TS0. This is the signal (A+B+C+D for TS0) appearing on line 20 of FIG. 6 for delivery to the parties of the conference call. This signal, of necessity, due to the inherent processing delays in the summation circuit 40, is delayed from the original PCM signals on lines 5 (lines 1-4 carrying A, B, C, D for TS0) which are also shown in FIG. 6 as the inputs to the delay line circuits 50.

Hence, as shown in FIG. 6, delta T represents the time difference between the time T2 for the summed signal on line 20 for time slot TS0 (A+B+C+D) and the time T1 for the imputing of TS0 signals A, B, C, and D appearing on lines 1-4. The delay line circuit 50 is designed to delay the speech data on lines 1-4 by the amount of delta T. In the above example, this time delay is 125 microseconds. The value of delta T would include any switch delays incurred as a result of signal routing and connection within the system. It is to be understood that the delta T time is by way of an example and the present invention is not limited to this delay. A number of conventional delay circuits could be utilized and in the present invention the speech data is delivered through a tapped delay line with taps at integer 125 microsecond intervals.

As shown in FIG. 6 by timing line T2, the delayed A, B, C and D TS0 speech data on lines 5 is aligned with the A+B+C+D TS0 summation speech data on lines 20. Delta T is simply the difference between time T1 and time T2. The delay circuit 50, therefore, precisely matches the timing of the speech data for each individual talker A through D with the summed A+B+C+D speech data.

Each subtract circuit 60 receives the TS0 speech data for A+B+C+D over line 20 as well as each delayed individual talker speech data A, B, C, and D over lines 54. Each individual subtract circuit 60 is enabled to perform subtraction through selective activation of the talk slot grant signal (TSG).

For example, assume all four talkers A, B, C, and D, are talking. The TSG for each subtract circuit 60 would be properly activated to authorize subtraction. In reference to FIG. 7, assume all four parties to a conference call (A, B, C, and D) are talkers and have their TSG activated (i.e., a "1" status) so that they are all talking on a conference call. The subtract circuit 60 operates to subtract each talker's speech data from the sum A+B+C+D so that the talker, as a listener, hears the other partys' speech but not his own. This occurs at time T3 (shown in FIG. 6) which is later than time T2 because of the necessary delays incurred by the subtract circuit 60. For this example, these reference times are:

T1=0

T2=125 Microseconds

T3=250 Microseconds

FIG. 7 shows the resulting speech being delivered to each listener A, B, C, and D for TS0. Hence, listener A hears B+C+D.

FIG. 8 illustrates a second example involving a conference call with four parties: A, B, C, and D. All parties, of course, are listeners. However, in this example, only parties A, B, and D are talkers. Hence, TSGs for A, B, and D are activated for subtraction whereas C is not activated. Talker A (who also listens to the conversation) receives conversation from B and D. Talker C receives conversation from A, B, and D (of course C is not talking and the actual conversation is from A+B+D). The selective activation of TSG enables the subtraction in circuit 60 to occur.

Exemplary data values for the example of FIG. 8 appears in the following two tables with talkers A, B and D and are the hexadecimal input speech values of 66, 35 and D6 respectively:

TABLE I

SUMMATION CIRCUIT 40
(Data Values are in Hexadecimal)
TS0

| Talker | μ-Law PCM Input Speech Data S | Linear Code Lines 402 | Line 412 | μ-Law PCM Line 20 |
|---|---|---|---|---|
| A | 66 | 0B1F | 624 | 59 |
| B | AA | FF40 | 624 | 59 |
| C | 35 | 0137 | 624 | 59 |
| D | D6 | FA81 | 624 | 59 |

TABLE II

SUBTRACTION CIRCUIT 60
TS0

| Talker | U-Law PCM Input Speech Data S | Line 54 | Line 20 | μ-Law PCM Lines 30 |
|---|---|---|---|---|
| A | 66 | 66 | 59 | D5 |
| B | AA | AA | 59 | 59 |
| C | 35 | 35 | 59 | 54 |
| D | D6 | D6 | 59 | 67 |

3. Details of Subtraction Circuit 60

In FIG. 9, the details of the subtraction circuit 60 are set forth. The subtraction circuit 60 is connected to receive the summed speech data for TS0 (A+B+C+D) on line 20. This PCM data is the sum of all speech appearing for the conference call during a respective time slot. The subtraction circuit 60 also receives the delayed individual talker speech data which in the example of FIG. 7 is talker A at time slot TS0. As in the case of FIG. 9, the PCM subtractor is a 131072 byte table look-up device (such as a 27C010 EPROM) that allows the appropriate incoming companded PCM data to be converted into a thirteen bit linear code which truly represents the analog value of the speech component. The linearized PCM at 54 is subtracted from the linearized PCM of 20 and the result is converted back into an 8 bit PCM companded signal for delivery to the listener 30.

It is to be expressly understood that the present invention is not limited to talkers A, B, C, or D as shown in FIG. 7 or even the examle shown in FIG. 8. These examples are illustrations. In conference calls, any number of parties can be interconnected and the present invention allows that number to be larger up to, for example, 128 parties. The present invention effectively provides talker nulling to each individual talker thereby eliminating echo and distortion. This is a one hundred percent elimination of echo.

4. Method

The method of the present invention is adapted for nulling each talker's speech in a conference call wherein the conference call comprises a number of parties who are selectively talkers and listeners. In a typical telephony environment, PCM telephone carrier lines according to CEPT or T1 standard are utilized and are connected to a digital conference bridge.

According to the method of the present invention, the PCM companded speech data from each of the parties who is talking is summed together by first converting the PCM companded speech from each talking party from PCM format to linear format. The linear speech data from each talking party is then added together and converted back into a PCM format. Additionally, the companded speech data from each talking party is delayed by an amount precisely necessary to complete the full summation of the speech data together as discussed above. The delayed companded speech data from each individual talker is then subtracted from the summed speech by first converting both the delayed speech and the summed speech from PCM format to linear format, subtracting the delayed speech (now in linear format) from the summed speech (now in linear format) and converting the difference between the two back into PCM format. The summed PCM speech data is then delivered to all other parties on the conference call while the speech data representing the difference is delivered to the individual speaker.

It is to be expressly understood that the claimed invention is not to be limited to the description of the preferred embodiment but encompasses other modifications and alterations within the scope and spirit of the inventive concept.

I claim:

1. A circuit (10) for nulling each talker's speech in a conference call, said conference call having a plurality of parties (n) who are talkers and listeners on PCM telephone carrier lines (k) connected to a digitized conference bridge, said circuit comprising:

means (40) connected to said PCM telephone carrier lines for digitally outputting the sum of all speech (20) on said PCM telephone carrier lines, all of said listeners who are not talking in said conference call receiving said sum of all speech, means (50) connected to said PCM telephone carrier lines for delaying the speech of each individual talker, means (60) connected to said outputting means and to said delaying means for subtracting the digital value of said delayed speech of each individual talker from said sum of all speech, said subtracting means delivering (30) said sum of all speech less said individual talker's speech as said individual talker listens, said delaying means delaying said speech of each said individual talker to match the timing of each said talker's speech in said sum of all speech.

2. The nulling circuit of claim 1 wherein said digitally outputting means (40) comprises:

means (400) receptive of PCM speech data on said PCM telephone carrier lines for converting said PCM speech data from PCM format to linear format, means (410) connected to said converting means for adding said speech data in linear format found in each PCM time slot together, means (420) connected to said adding means for converting said added linear speech data in each said PCM time slot from linear format to said sum of all speech in PCM format.

3. The nulling circuit of claim 2 wherein said PCM format is in μ-law companded format for T1 transmission.

4. The nulling circuit of claim 2 wherein said PCM format is in A-law companded format for CEPT transmission.

5. The nulling circuit of claim 2 wherein said PCM to linear converting means is a look-up table.

6. The nulling circuit of claim 2 wherein said adding means is a sixteen bit adder.

7. The nulling circuit of claim 2 wherein said linear to PCM converting means is a look-up table.

8. The nulling circuit of claim 1 wherein said subtracting means (60) comprises:

means (900) receptive of said delayed speech of each said individual talker from said delaying means and of said sum of all speech from said digitally outputting means for converting both said delayed speech and said sum of all speech from PCM format to linear format, means (910) connected to the aforesaid converting means for subtracting said delayed speech in linear format from said sum of all speech signal in linear format to output a resultant linear subtracted speech data so that said individual talker's speech is nulled out, means (920) receptive of said subtracted speech data from said subtracting means for converting said subtracted speech data from linear format to PCM format.

9. The nulling circuit of claim 8 wherein said PCM format is in μ-law companded format for T1 transmission.

10. The nulling circuit of claim 8 wherein said PCM format is in A-law companded format for CEPT transmission.

11. The nulling circuit of claim 8 wherein said PCM to linear converting means is a look-up table.

12. A circuit (10) for nulling each talker's speech in a conference call, said conference call having a plurality parties (n) who are talkers and listeners on PCM telephone carrier lines (k) connected to a digitized conference bridge, said circuit comprising:

means (400) receptive of PCM speech data from said talkers on said PCM telephone carrier lines for converting said PCM signals from PCM format to linear format, means (410) connected to said converting means for adding the linear speech data from said talkers found in each PCM time slot together, means (420) connected to said adding means for converting said added linear speech data from said talkers in each said PCM time slot from linear format to in PCM format, means (50) connected to said PCM telephone carrier lines for delaying said speech data from each individual talker, means (900) receptive of said delayed speech data from each said individual talker from said delaying means and of said added PCM speech data for converting said delayed speech data and said added PCM speech data from PCM format to linear format, means (910) receptive of the aforesaid converted linear speech data for subtracting said delayed speech data in linear format from said added speech data in linear format to output a resultant linear speech data with said individual talker's speech nulled out, means (920) receptive of said resultant linear speech data from said subtracting means for converting said resultant linear speech data from linear format to PCM format.

13. The nulling circuit of claim 12 wherein said PCM format is in μ-law companded format for T1 transmission.

14. The nulling circuit of claim 12 wherein said PCM format is in A-law companded format for CEPT transmission.

15. A method for nulling each talker's speech in a conference call, said conference call having a plurality of parties(n) who are talkers and listeners in a companded PCM speech format on PCM telephone carrier lines (k) connected to a digitized conference bridge, said method comprising the steps of:
- linearly summing all PCM companded speech data from said parties on said PCM telephone carrier lines,
- delaying the PCM companded speech data of each individual talker by the amount of time necessary to complete the aforesaid step,
- linearly subtracting the delayed PCM companded speech data from each individual talker form the sum of all PCM companded speech,
- delivering the sum of all PCM companded speech on said PCM telephone carrier lines to all listeners who are not talking, and
- delivering the sum of all PCM companded speech having the delayed PCM companded speech from each individual talker subtracted therefrom to each individual listener who is talking.

16. A method for nulling each talker's speech in a conference call, said conference call having a plurality of parties (n) who are talkers and listeners in a companded PCM format on PCM telephone carrier lines (k) connected to a digitized conference bridge, said method comprising the steps of:
- summing all PCM companded speech data from said parties on said PCM telephone carrier lines, said step of summing further comprising the steps of:
  - (a) converting said PCM companded speech data on said PCM telephone carrier lines from PCM format to linear format,
  - (b) adding the speech data in linear format for each party together,
  - (c) converting said linearly added speech data from linear format to PCM format,
- delaying the PCM companded speech data of each individual talker by the amount of time necessary to complete the aforesaid steps,
- subtracting the delayed PCM companded speech data from each individual talker from the sum of all PCM companded speech, said step of subtracting further comprising:
  - (a) converting said delayed PCM companded speech data and said sum of all PCM companded speech from PCM format to linear format,
  - (b) subtracting the delayed speech data in linear format from the sum of all PCM companded speech in linear format,
  - (c) converting the speech data representing difference from said subtraction from linear format to PCM format,
- delivering the sum of all PCM companded speech on said PCM telephone carrier lines to all listeners who are not talking,
- delivering the sum of all PCM companded speech having the delayed PCM companded speech from each individual talker subtracted therefrom to each individual listener who is talking.

* * * * *